Oct. 6, 1959    G. J. BADGLEY    2,907,531
REVERSE DRIVE MECHANISM FOR CAMERAS AND THE LIKE
Original Filed Jan. 13, 1954    4 Sheets-Sheet 1
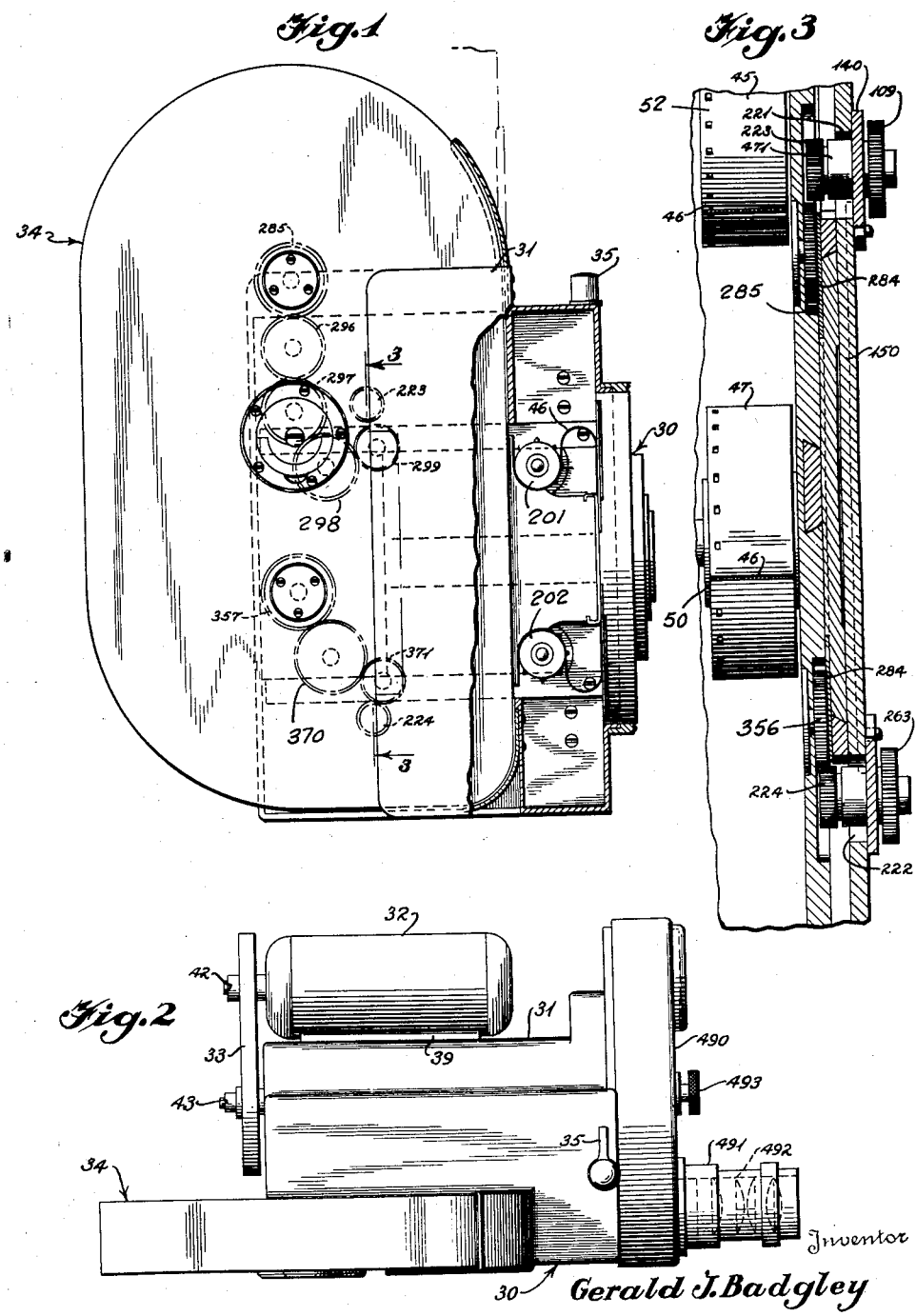
Inventor
Gerald J. Badgley
By R. J. Tompkins
Attorney Oct. 6, 1959 G. J. BADGLEY 2,907,531
REVERSE DRIVE MECHANISM FOR CAMERAS AND THE LIKE
Original Filed Jan. 13, 1954 4 Sheets-Sheet 2
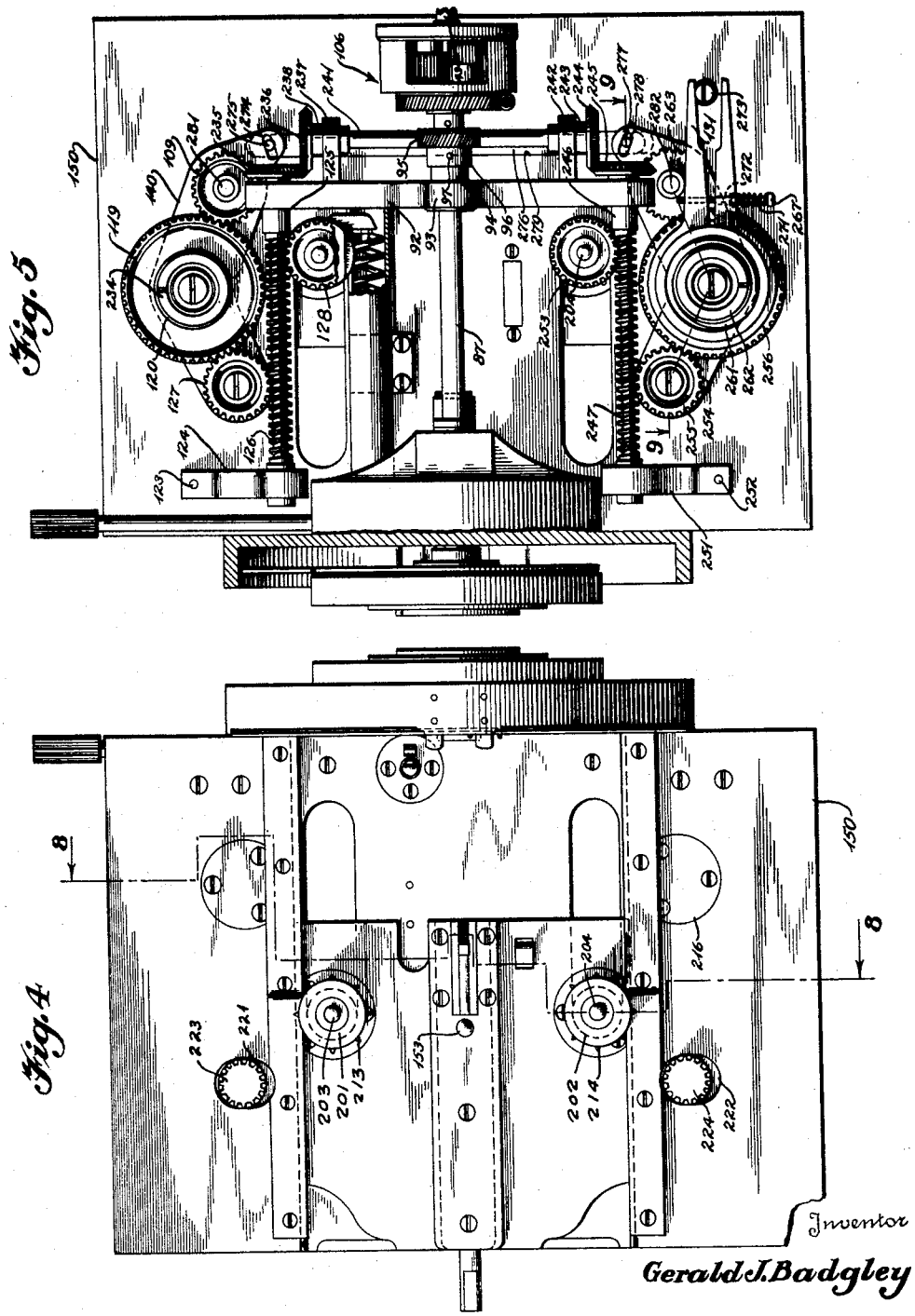
Inventor
Gerald J. Badgley
By R. J. Tompkins
Attorney Oct. 6, 1959 G. J. BADGLEY 2,907,531
REVERSE DRIVE MECHANISM FOR CAMERAS AND THE LIKE
Original Filed Jan. 13, 1954 4 Sheets-Sheet 3
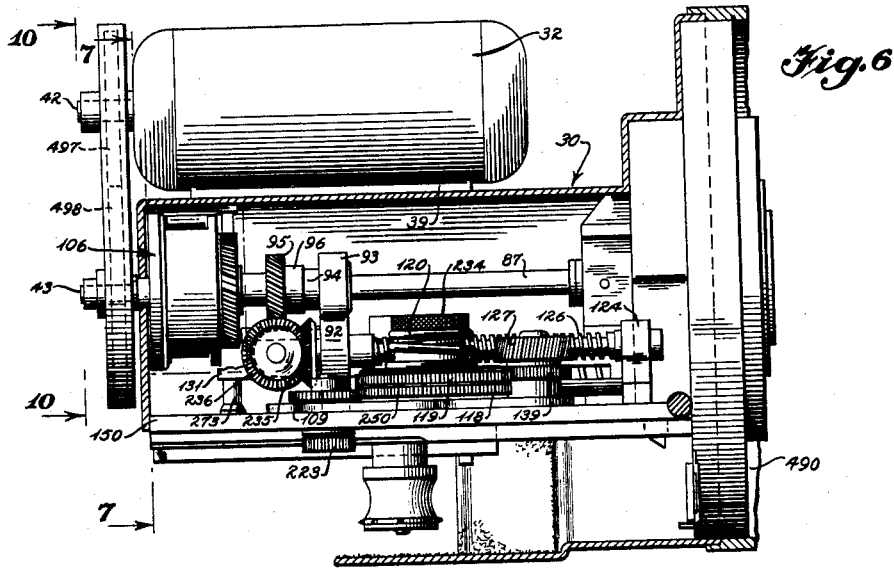
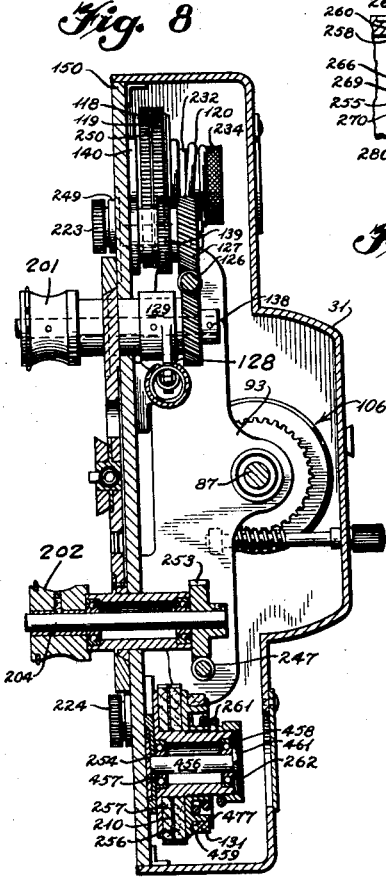
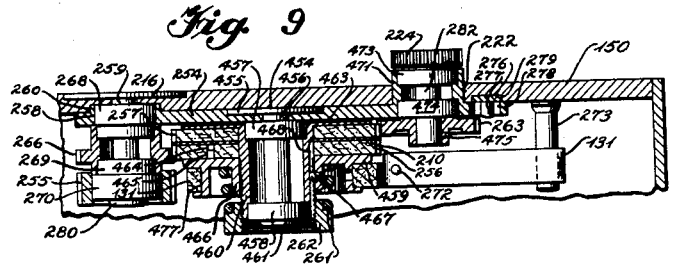
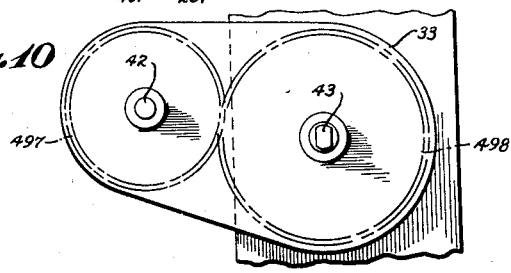
Inventor
Gerald J. Badgley
By R. J. Tompkins
Attorney Oct. 6, 1959   G. J. BADGLEY   2,907,531
REVERSE DRIVE MECHANISM FOR CAMERAS AND THE LIKE
Original Filed Jan. 13, 1954   4 Sheets-Sheet 4
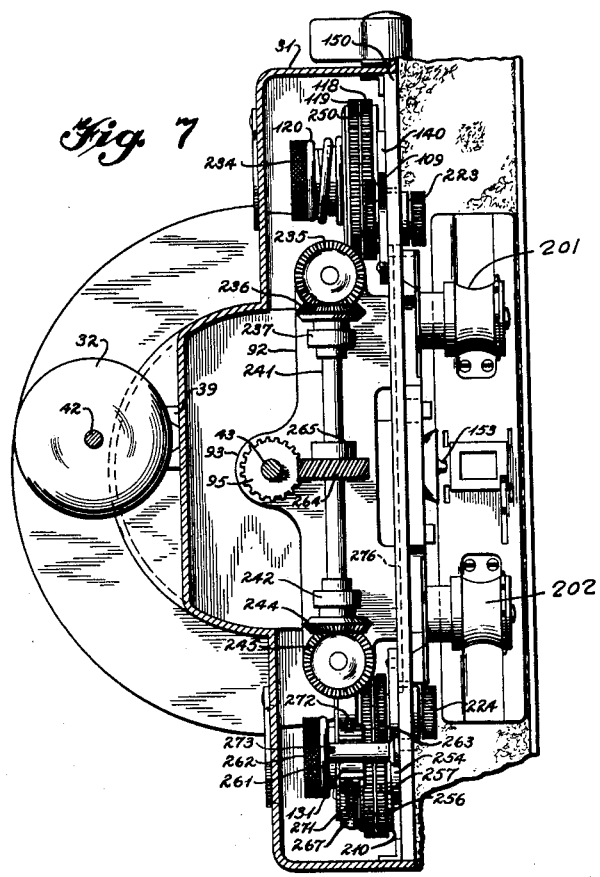
Inventor
Gerald J. Badgley
By R. J. Tompkins
Attorney

United States Patent Office 2,907,531
Patented Oct. 6, 1959

2,907,531

REVERSE DRIVE MECHANISM FOR CAMERAS AND THE LIKE

Gerald J. Badgley, District Heights, Md.

Original application January 13, 1954, Serial No. 403,944, now Patent No. 2,807,188, dated April 21, 1950. Divided and this application October 14, 1955, Serial No. 540,655

8 Claims. (Cl. 242—55.12)

(Granted under Title 35, U.S. Code (1952), sec. 266)

The invention described herein may be manufactured and used by or for the Government of the United States of America for governmental purposes without the payment of any royalties thereon or therefor.

This invention relates to motion picture apparatus, and is a division of application Serial No. 403,944 filed January 13, 1954, now Patent No. 2,807,188, said application being a continuation of application Serial No. 157,392 filed April 21, 1950, and now abandoned.

More specifically this invention discloses an arrangement for reversibly driving the motion picture apparatus solely by reversing the direction of rotation of the drive means without the use of additional manually operable controls.

Prior art reversible motion picture apparatus have utilized reversible clutch means or other controls in addition to the drive means for the purpose of reversing the feed of the apparatus when required. However, the instant invention discloses an arrangement for reversing the direction of feed of the apparatus by merely reversing the direction of rotation of the drive means.

It is to be noted that the motion picture apparatus disclosed by the instant invention is capable of use in both cameras and projectors and that the apparatus is limited only by the scope of the appended claims.

Accordingly, it is an object of the invention to provide new and improved motion picture apparatus.

Another object of the instant invention is to disclose an arrangement for selectively driving either of the reels of the motion picture apparatus by merely reversing the drive means of the apparatus.

Other objects and advantages will become apparent after a consideration of the following description taken in connection with the accompanying drawings, in which:

Fig. 1 is an assembly view of one embodiment of apparatus suitable for practicing the invention;

Fig. 2 is a plan view of the embodiment of apparatus shown in Fig. 1 with a lens mount attached thereto;

Fig. 3 is an enlarged fragmentary sectional view of the gear drive mechanism for the supply and take-up reels of the magazine taken along the lines 3—3 of Fig. 1;

Fig. 4 is a side elevational view of the film threading portion of the apparatus;

Fig. 5 is a side elevational view of the apparatus as seen from the opposite side from Fig. 4;

Fig. 6 is an additional plan view of the interior of the apparatus of Fig. 2, and in which the case is shown in section;

Fig. 7 is a rear elevational view taken along the line 7—7 of Fig. 6;

Fig. 8 is a sectional view taken along the lines 8—8 of Fig. 4;

Fig. 9 is a sectional view taken along the line 9—9 of Fig. 5; and

Fig. 10 is a fragmentary view of a portion of the gear drive mechanism of the apparatus taken on the line 10—10 of Fig. 6.

Referring now to the drawings for a more complete understanding of the invention, in which like reference characters are used throughout to designate like parts, and more particularly to Fig. 2 thereof, there is shown a casing or frame generally designated by the reference numeral 30, and having casing 31. A drive motor 32 of any convenient design may be mounted upon casing 31, as by support 39, having a drive shaft 42 which has secured thereto the gear 497, Fig. 10, which meshes with gear 498 secured to shaft 43, the gears being mounted within the gear housing frame 33. Shaft 43, as will be subsequently more clearly apparent, functions as the power input shaft for the apparatus. A detachable magazine generally designated by the reference numeral 34 is provided for the film, and manually operated release lever 35 is provided for releasing the magazine 34 from the casing or frame 30. The reference numeral 490 indicates a lens mount maintained in position by member 493 and having the lens barrel 491 mounted thereon, which contains a lens of any convenient design and generally designated by the reference numeral 492.

Particular reference is made now to Figs. 5 and 8 for a more complete understanding of the invention. The supply and take-up spools 50, 52 in the film magazine 34 each has a gear 356, 285 respectively associated therewith, adapted, when the associated gear is driven through their respective gear trains 370, 371 and 296—299, to rotate the associated film spool. The drive shaft 87, driven from shaft 43 through synchronizing mechanism 106, has secured thereto a gear 95, Fig. 5, having hub portion 96 and set screw 97, and spaced from bearing support 93 by spacer member 94. The gear 95 meshes with a gear 264, Fig. 7, having hub portion 265, gear 264 being secured to shaft 241, Fig. 5, for rotation therewith. Shaft 241 is supported in bearings in a pair of bearing support members 237 and 242, mounted as shown, and has secured to the upper end thereof bevel gear 236 having hub portion 238, and having secured to the lower end portion bevel gear 244 having hub portion 243.

Meshing with aforementioned gear 236 is a bevel gear 235 secured to a shaft 125 for rotation therewith, the shaft 125 being rotatably mounted in bearings in end piece 92 and bearing support 124 secured to plate 150 as by screw 123. The shaft 125 has a portion thereof formed into the worm gear 126.

A second gear 127 is provided, meshing with worm 126, and is rotatably mounted upon a post 138. Gear 139, Fig. 6, is mounted upon the same axis and is secured to or integral with gear 127 for rotation therewith. Pivotally mounted upon the support post 138 for gears 127 and 139, and pivoting about the axis of rotation of these gears 127 and 139, is the flat support member 140, Fig. 5, having centrally mounted thereon along a mutual axis a pair of rotatable gears 118 and 119, Fig. 6. Gear 119 meshes with gear 139, while gear 118 meshes with a gear 109 mounted for rotation upon support 140 in hub or bearing 249, Fig. 8, and secured to shaft 281 for rotation therewith. Shaft 281 passes through aperture 221 in plate 150, and has secured thereto to rotate therewith the gear 223.

Disposed adjacent the aforementioned lower bevel gear 244, Fig. 5, and meshing therewith is a bevel gear 245 secured to a shaft 246 for rotation therewith, shaft 246 being supported in bearings in members 92 and 251, member 251 being secured to plate 150 as by screw 252. Shaft 246 has a portion thereof formed into the worm gear 247, which has meshing therewith the gear 253 secured to shaft 204 for rotation therewith, and also has meshing therewith gear 255 which has on the same axis of rotation gear 266, Fig. 9. The plate 216 mounted in plate 150, has the post or stub shaft 259 formed integral therewith with ball bearings 268, 269, and 270 provided as shown, and retaining screw 280 for maintaining the outer ball bearing in place upon shaft or post 259. Pivotally mounted for pivotal movement about post or shaft 259 is a support member 254, Figs. 5 and 9, having hub portion 258 rotatably mounted in aperture 260, the member 254 having substantially centrally disposed thereon the axially aligned gears 257 and 256. To provide support for the aforementioned gears 257 and 256, the pivoted plate support 254 has mounted in recess 455 therein a plate member 454 having shaft 456 formed integral therewith. Mounted upon shaft 456 is a casing or sleeve member 460, having flange portion 463, and having its other end threaded as shown, member 460 being rotatably mounted upon ball bearings 457 and 458, retaining screw 461 threaded in the end of shaft 456 holding the bearing 458 in place. The aforementioned gear 257 is rotatably mounted upon sleeve 460 as shown, and gear 256 is fixedly mounted on sleeve 460, these gears being separated by the thin washer 210 which is preferably composed of Phosphor bronze or other suitable material for allowing slipping movement between gears 257 and 256. Gear 256 has an aperture 464 therein for receiving a pin 465 attached to the flange portion 459 of a sleeve member 466 mounted upon inner sleeve 460, and secured for rotation therewith by set screw 467 in keyway 468 of sleeve 460, thus effectively securing gear 256 for rotation with sleeve 460. The sleeve member 466 has an outer rim or collar portion 477 upon which is mounted a reversing yoke 131, see Figs. 5 and 9. The spring 261 exerts a pressure on flange 459, and the amount of the tension may be adjusted by changing the position of a cap 262 threaded upon sleeve 460. The gears 256 and 257 accordingly rotate together, with some slippage between them as regulated by the tension of spring 261.

The yoke member 131 has a screw 267 connecting the arms thereof, screw 267 being threaded in one yoke arm and extending through aperture 272 in the other yoke arm, with spring 271, Fig. 5, providing an adjustable tension. Post 273 mounted in plate 150 is provided between the yoke arms, for purposes to be subsequently apparent.

The aforementioned plate 150 has an aperture 222 therein through which a hub bearing support 471 formed integral with member 254 extends, Fig. 9. The hub 471 supports shaft 282 in ball bearings 473 and 474, gear 224 being secured to one end of shaft 282 for rotation therewith, a gear 263 meshing with aforementioned gear 257 being secured to the other end of shaft 282 by set screw 475 for rotation therewith.

The construction of the above described mechanism is generally similar to the mechanism including gears 127, 139, 119, 118 and 109, except that the threaded sleeve 232 supporting gear 118 and 119 does not have an additional sleeve and yoke mechanism mounted thereon. Spring 120 exerts its pressure against gear 119, Fig. 8.

The aforementioned gears 118 and 119, Fig. 8, are not secured to each other, but may rotate independently of each other. They are separated by a thin gasket 250 preferably made of Phosphor bronze or other suitable material for allowing slipping between them, and are pressed together by spring 120, the tension of which may be adjusted by nut 234 threaded on bearing sleeve 232. This arrangement provides for slippage between gears 118 and 119. In use, the tension of spring 120 is preadjusted in accordance with the type of film to be employed. The gear mechanism for driving the take-up reel has a similar aforedescribed arrangement for permitting slippage.

Secured to shafts 203 and 204 for rotation therewith are film sprockets 201 and 202 respectively, having sets of sprocket teeth 213 and 214 respectively for engaging the film.

In normal operation, the amount of film taken per revolution of the take-up reel increases, while the amount of film advanced past the photo aperture per revolution remains constant. The difference must be compensated for by slip in the take-up drive. This mechanism is normally operative only on the take-up, but is incorporated in both feed and take-up ends in case the camera is reversed, in which event the feed reel then becomes the take-up.

Members 140 and 254, Fig. 5, are operatively connected by way of a cross bar 276 slidably mounted in slot or groove 279 in plate 150, member 276 having pins 275 and 277 at the ends thereof for engagement in the slots 274 and 278 respectively in pivotally mounted support members 140 and 254 respectively.

It will be understood that, upon reversal of the direction of rotation of shaft 87, member 276 is moved up or down, Fig. 5, from its former position, with the result that gears 223 or 224, Fig. 4, selectively engage the associated gears of the film magazine respectively depending upon the direction of rotation of the shaft, thereby providing for running the film backward or forward through the camera.

The above described reversing mechanism is responsive only to the direction of rotation of the main drive shaft 87 of the apparatus and does not require additional controls for operation. The reversing mechanism operates as follows:

Assume that shaft 87 is rotating in one direction and is reversed to rotate in a direction which causes shaft 247, Fig. 5, to drive gear 254 in a clockwise direction, which in turn causes gear 256 to rotate in a counterclockwise direction which will cause sleeve 460, upon which gear 256 is mounted, to rotate in a counter-clockwise direction. Reversing lever 131 which is slidably mounted on collar 466 which is fixedly secured to sleeve 460 tends to rotate in a counter-clockwise direction, Fig. 5. In this case the lower prong of lever 131 will rotate upward and abut post or pin 273, which in turn will cause the entire supporting member 254 to tend to rotate in a clockwise direction, Fig. 5, about the post or shaft 259 upon which gear 255 is mounted. Thus gear 263, and gear 224 which is attached to the same shaft, move downward in Fig. 5. Member 276 is attached to support members 254 and 140 and therefore as support member 254 moves downward and clockwise about post or shaft 259 upon which gear 255 is mounted it causes support member 140 to move clockwise about the post 138 upon which gear 127 is mounted. Gear 223, mounted on support member 140 will therefore be forced into mesh with gear 299 on the side of the magazine. On the other hand, if the direction of rotation of gear 254 is opposite to that described above, then gear 224 will be placed into mesh with gear 371, on the magazine, in accordance with the mode of operation discussed above. It can therefore be seen that the direction of rotation of the main drive shaft 87 of the apparatus is the sole factor in determining whether the film will feed in a forward or reverse direction.

As is well known in the art, when a camera is used for studio work, a reverse film take up is desirable, since it is desirable that the camera run backwards.

In the camera of the subject invention, this is accomplished by a device which automatically disengages the bottom or take-up spool and engages the top or supply spool. This device is so constructed and arranged that it does not load the mechanism when the camera is speeded up, but on the contrary, the faster the camera is run, the less the drag, so that the film convolutions are uniformly snug, and no damage to the film can occur.

Any suitable source, not shown, may be employed for energizing the drive motor 32.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A reversible coiling arrangement for coiling a strip of material comprising a frame, reversible drive means mounted on said frame, first and second posts mounted on said frame, first and second gears mounted on said first and second posts, respectively, said drive means being coupled to said first and second gears for imparting rotation thereto, first and second arms pivotally mounted relative to said first and second posts, respectively, third and fourth gears journalled on said first and second arms, respectively, and operatively connected to said first and second gears, respectively, for rotation thereby, reels mounted on said frame in spaced relationship to each of said first and second arms, fifth and sixth gear means mounted on said frame relative to said reels for selectively imparting rotation thereto when engaged by said third and fourth gears, respectively, reversing means mounted relative to said first arm for causing pivotal movement of said arm solely in response to the direction of rotation of said drive means, a link member connecting said first and second arms for causing a corresponding pivotal movement of the second arm in response to the pivotal movement of said first arm, said third and fourth gears rotating in a direction which is dependent on the direction of rotation of the drive means and selectively engaging said fifth and sixth gear means, respectively, in response to the pivotal movement of said arms to cause either said third gear to engage said fifth gear means or said fourth gear to engage said sixth gear means to thereby selectively cause rotation of said reels in opposite directions solely in response to the direction of rotation of said drive means.

2. An arrangement as set forth in claim 1 wherein said reversing means comprises a rotatable collar mounted on said arm in operative relationship to said first gear, a yoke member frictionally engaging said collar member, a third post affixed to said frame, said yoke member cooperating with said third post to effect pivotal movement of said first arm depending on the direction of rotation of said drive means.

3. An arrangement as set forth in claim 2 wherein means are affixed to said first and second arms for maintaining constant tension to the strip of material being coiled.

4. An arrangement as set forth in claim 2 wherein said means for maintaining the tension to said strip of material being coiled comprises a friction clutch interposed between said first and third gears and between said second and fourth gears.

5. A reversible arrangement for coiling a strip of material at a constant linear rate comprising a frame, reversible drive means mounted on said frame, first and second posts mounted on said frame, first and second gears mounted on said first and second posts, respectively, said drive means being coupled to said first and second gears for imparting rotation thereto, first and second arms pivotally mounted relative to said first and second posts, respectively, third and fourth gears journalled on said first and second arms, respectively, and operatively connected to said first and second gears, respectively, for rotation thereby, reels mounted on said frame, in spaced relationship to each of said first and second arms, fifth and sixth gear means mounted on said frame relative to said reels for imparting rotation thereto when selectively engaged by said third and fourth gears, respectively, means mounted relative to said first arm for causing pivotal movement of said arm solely in response to the direction of rotation of said drive means, a link member connecting said first and second arms for causing a corresponding pivotal movement of said second arm in response to the pivotal movement of said first arm, said third and fourth gears rotating in a direction which is dependent on the direction of rotation of the drive means and selectively engaging said fifth and sixth gear means, respectively, in response to the pivotal movement of said arms to cause either said third gear to engage said fifth gear means or said fourth gear to engage said sixth gear means to thereby selectively cause rotation of said reels in opposite directions solely in response to the direction of rotation of said drive means, and means operatively coupled to said drive means for feeding said strip of material at a constant linear rate in a direction dependent on the direction of rotation of said drive means.

6. An arrangement as set forth in claim 5 wherein said means for feeding said strip at a constant linear rate in a direction dependent on the direction of rotation of said drive means comprises first means in contact with said strip of material and coupled to said drive means for feeding said strip of material at a constant linear rate, and friction clutch means operatively interposed between said first and third gears and between said second and fourth gears for allowing the reel which is connected to the driven means to wind only as much of the strip as is fed by said first means.

7. An arrangement as set forth in claim 5 wherein said means mounted relative to said first arm for causing pivotal movement of said arm solely in response to the direction of rotation of said drive means comprises a rotatable collar journalled on said first arm in operative relationship to said first and third gears, a yoke member frictionally engaging said collar member, a third post affixed to said frame, said yoke member cooperating with said third post to effect pivotal movement of said first arm depending on the direction of rotation of said drive means.

8. An arrangement as set forth in claim 7 wherein said means for feeding said strip at a constant linear rate in a direction dependent on the direction of rotation of said drive means comprises first means in contact with said strip of material and coupled to said drive means for feeding said strip of material at a constant linear rate, and friction clutch means operatively interposed between said first and third gears and between said second and fourth gears for allowing the reel which is connected to the drive means to wind only as much of the strip as is fed by said first means.

References Cited in the file of this patent

UNITED STATES PATENTS

| | | |
|---|---|---|
| 1,789,607 | Steurer | Jan. 20, 1931 |
| 2,069,595 | Thomas | Feb. 2, 1937 |
| 2,163,593 | Draeger | June 27, 1939 |
| 2,215,468 | Herzig | Sept. 24, 1940 |
| 2,576,710 | Andrews | Nov. 27, 1951 |
| 2,611,284 | Albee | Sept. 23, 1952 |

UNITED STATES PATENT OFFICE
CERTIFICATE OF CORRECTION

Patent No. 2,907,531                               October 6, 1959

Gerald J. Badgley

It is hereby certified that error appears in the printed specification of the above numbered patent requiring correction and that the said Letters Patent should read as corrected below.

Column 1, lines 5 to 8, for "Original application January 13, 1954, Serial No. 403,944, now Patent No. 2,807,188, dated April 21, 1950. Divided and this application October 14, 1955, Serial No. 540,655" read -- Original application January 13, 1954, Serial No. 403,944, now Patent No. 2,807,188, dated September 24, 1957. Divided and this application October 14, 1955, Serial No. 540,655 --.

Signed and sealed this 24th day of May 1960.

(SEAL)
Attest:

KARL H. AXLINE                              ROBERT C. WATSON
Attesting Officer                          Commissioner of Patents